(12) United States Patent
Chen et al.

(10) Patent No.: US 6,639,334 B2
(45) Date of Patent: Oct. 28, 2003

(54) JET IMPINGEMENT COOLING OF ELECTRIC MOTOR END-WINDINGS

(75) Inventors: Kanghua Chen, Canton, MI (US); Abul Masrur, West Bloomfield, MI (US); Sayeed Ahmed, Canton, MI (US); Vijay K Garg, Canton, MI (US)

(73) Assignee: Ballard Power Systems Corporation, Dearborn, MI (US)

( * ) Notice: Subject to any disclaimer, the term of this patent is extended or adjusted under 35 U.S.C. 154(b) by 0 days.

(21) Appl. No.: 09/683,199

(22) Filed: Nov. 30, 2001

(65) Prior Publication Data

US 2003/0102728 A1 Jun. 5, 2003

(51) Int. Cl.[7] .................................................. H02K 9/00
(52) U.S. Cl. ............................ 310/52; 310/53; 310/54; 310/260
(58) Field of Search .............................. 310/52, 53, 54, 310/57, 59, 260, 64

(56) References Cited

U.S. PATENT DOCUMENTS

| | | | | | |
|---|---|---|---|---|---|
| 3,681,628 A | * | 8/1972 | Krastchew | .................... | 310/54 |
| 3,708,705 A | * | 1/1973 | Tinlin | .......................... | 310/52 |
| 4,959,569 A | * | 9/1990 | Snuttjer et al. | ............... | 310/53 |
| 6,144,123 A | * | 11/2000 | Selci | .......................... | 310/52 |

* cited by examiner

*Primary Examiner*—Thanh Lam
(74) *Attorney, Agent, or Firm*—Seed IP Law Group PLLC (57) ABSTRACT

An assembly for cooling an electric motor, the assembly comprising a housing, a stator, a rotor, a winding, an end-winding integrally formed with the winding, and a jet impingement device operable for exposing the end-winding to a temperature controlled stream of fluid. A method for transferring heat between a stream of impinging fluid and the surface of an electric motor end-winding. An electric motor comprising a jet impingement cooling assembly.

18 Claims, 5 Drawing Sheets

JET IMPINGEMENT COOLING OF ELECTRIC MOTOR END-WINDINGS

BACKGROUND OF INVENTION

1. Field of the Invention

The present invention relates generally to an assembly and method used to improve electric motor performance and reliability. This invention relates specifically to an assembly and method of implementing jet impingement cooling for the removal of dissipated heat from the end-windings of a sealed electric motor, operating in a harsh environment such as an automotive vehicle.

2. Background

Electric motors are used as the driving means for everything from electric vehicles to domestic appliances. Improvements in electric motor performance and reliability for all types of electric motors are desired. The presence of high power levels of electric motors results in high temperature operation which causes distortions in the operating characteristics of the motor. In the absence of heat removal liberated during motor operation, poor, degraded performance, and possibly total motor failure may result. As electronic device technology advances, there is a continuous reduction in component size, while simultaneously demanding these components to handle increasingly greater levels of power. As component size decreases and power levels increase, higher operating temperatures result. The presence of elevated temperatures of electric motors is attended by a variety of operational difficulties and malfunctions. For example, it is heat which does the most damage to permanent magnets contained within the electric motor. If the electric motor is severely overheated, diminished magnet strength, and hence degraded motor performance will take place.

There are several conventional methods for cooling electric motors. Natural convection cooling, for example, is a passive process involving the transfer of heat by the natural movement of air. Hot air tends to rise and is replaced by surrounding cooler, more dense air. Natural convection cooling includes several drawbacks, such as the small amount of dissipated heat that it is able to remove. Natural convection cooling does not allow for large enough amounts of heat to be removed in the time necessary to avoid operational difficulties. As stated above, electric motors carry large currents to produce high power, which results in high temperatures. As temperatures increase, operational difficulties and malfunctions may occur.

Lower motor operating temperatures result in an increase in motor efficiency. A lower motor temperature allows for more current to be carried by the motor windings, which in turn produces greater power output.

What is needed is an assembly and method that is able to remove large quantities of dissipated heat from electric motor end-windings. The larger the quantity of dissipated heat removed, the more efficient the motor will be, and consequently, the larger the amount of power that it will be able to handle.

SUMMARY OF INVENTION

To achieve the foregoing objectives, the present invention provides an assembly for cooling an electric motor; the assembly comprises a housing, a stator disposed within the housing operable for generating a magnetic field, a rotor disposed within the housing operable for receiving the magnetic field and generating a torque, a winding operatively connected to the stator, an end-winding integrally formed with the winding which hangs out of the stator stack, and a jet impingement device operable for exposing the end-winding to a temperature controlled stream of fluid.

The assembly further provides an inlet operable for introducing and exposing the temperature controlled stream of fluid to the end-winding, and an outlet operable for removing fluid from the housing. The inlet may comprise a nozzle which directs the temperature controlled stream of fluid to the end-windings.

The temperature controlled stream of fluid may comprise air or other fluid, and is generated in a temperature controlled fluid generating device, such as an air compressor. The air compressor may further include a pathway for the temperature controlled fluid from the temperature controlled fluid generating device to the inlet.

The present invention further provides a method for transferring heat between a stream of fluid impinging the surface of an electric motor end-winding, and the end-winding itself. The method comprises controlling the temperature of a volume of fluid, establishing a stream of fluid from the volume of fluid to an inlet, delivering the temperature controlled fluid from the inlet to the end-winding such that heat is transferred between the surface of the end-winding and the stream of fluid impinging the surface of the end-winding, and removing fluid from the electric motor via an outlet.

The present invention further provides an electric motor comprising a housing, a stator disposed within the housing operable for generating a magnetic field, a rotor disposed within the housing operable for receiving the magnetic field and generating a torque, a winding operatively connected to the stator, an end-winding integrally formed with the winding, and a jet impingement device operable for exposing the end-winding to a temperature controlled stream of fluid.

DETAILED DESCRIPTION

As required, detailed embodiments of the present invention are disclosed herein, however, it is to be understood that the disclosed embodiments are merely exemplary of the invention that may be embodied in various and alternative forms. Specific structural and functional details disclosed herein are not to be interpreted as limiting, but merely as a basis for the claims and as a representative basis for teaching one skilled in the art to variously employ the present invention.

Figure 1:
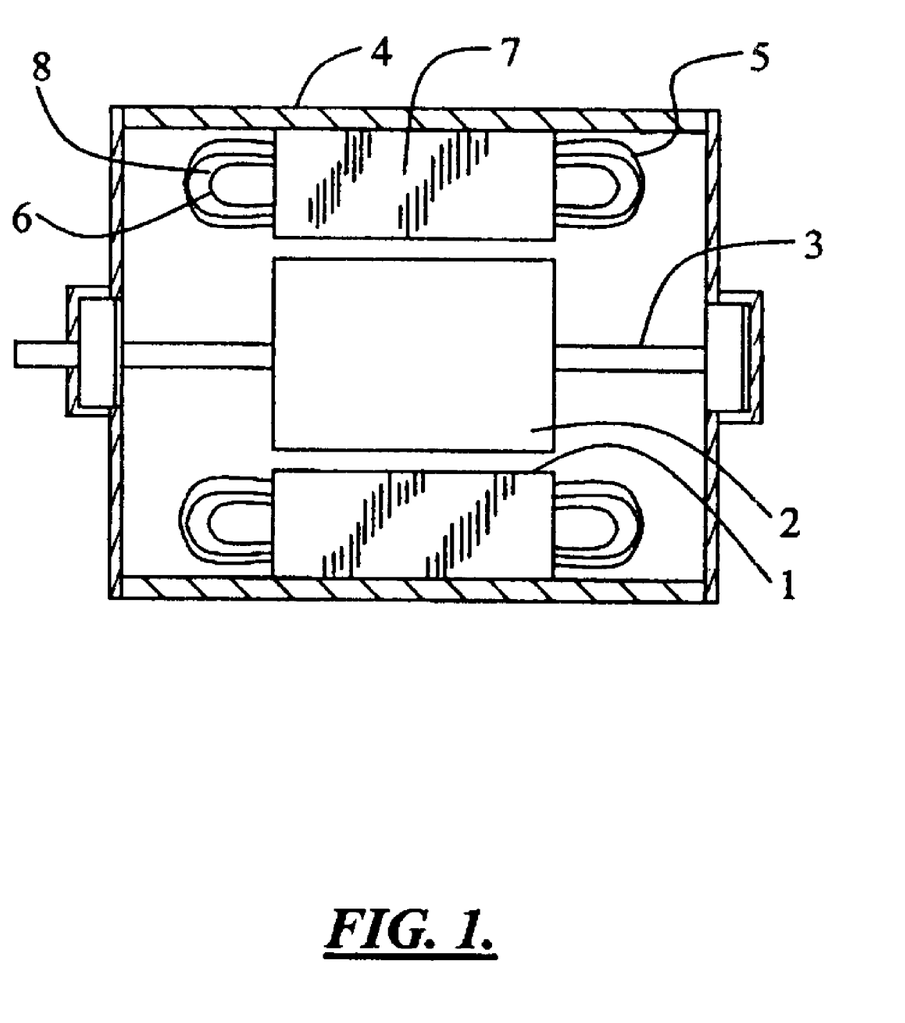
FIG. 1 schematically shows an electric motor in cross-sectional view comprising a stator which includes an end-winding integrally formed with a winding.

An arrangement of a motor is schematically shown in a cross-sectional view in FIG. 1, which is a representation of an electric motor. As shown in FIG. 1, the motor comprises a stator 1, a rotor 2, a shaft 3 of the rotor 2, and a motor housing 4. The stator 1 has winding/coil 5 insulated from the stack, formed by winding an insulated wire 6 around a core with a predetermined electrical specification, and the wire 6 has an enamel coating outside which functions as an insulation. Passing an electric current through the winding 5 from the outside generates an electromagnetic force, which rotates the rotor 2. The winding 5 comprises intimately wound wire 6 and may be wrapped with epoxy to avoid flexing. The winding 5 is what differentiates one motor from the next, and has a great deal to do with the performance of the motor. The winding 5 is wrapped around the core and inserted into the steel stator 1. The core comprises a cooling jacket 7 which is wrapped around the stator 1 outer surface. The purpose of the cooling jacket 7 is to transfer dissipated heat from the winding 5 to the cooling jacket 7. Hanging end-windings 8 are not enclosed within the cooling jacket 7, and therefore require an alternate system for cooling.

As stated above, one example of a conventional system for cooling the end-windings 8 involves natural convection. A second conventional system for cooling the end-windings 8 consists of attaching a fan to the rotor shaft 3, the fan being operable for cooling the end-windings 8 when the rotor shaft 3 spins. Drawbacks to both of these cooling systems include the amount of heat that can be removed from the end-windings 8 due in part to using recirculated air contained within the motor housing 4 for the cooling.

Figure 2:
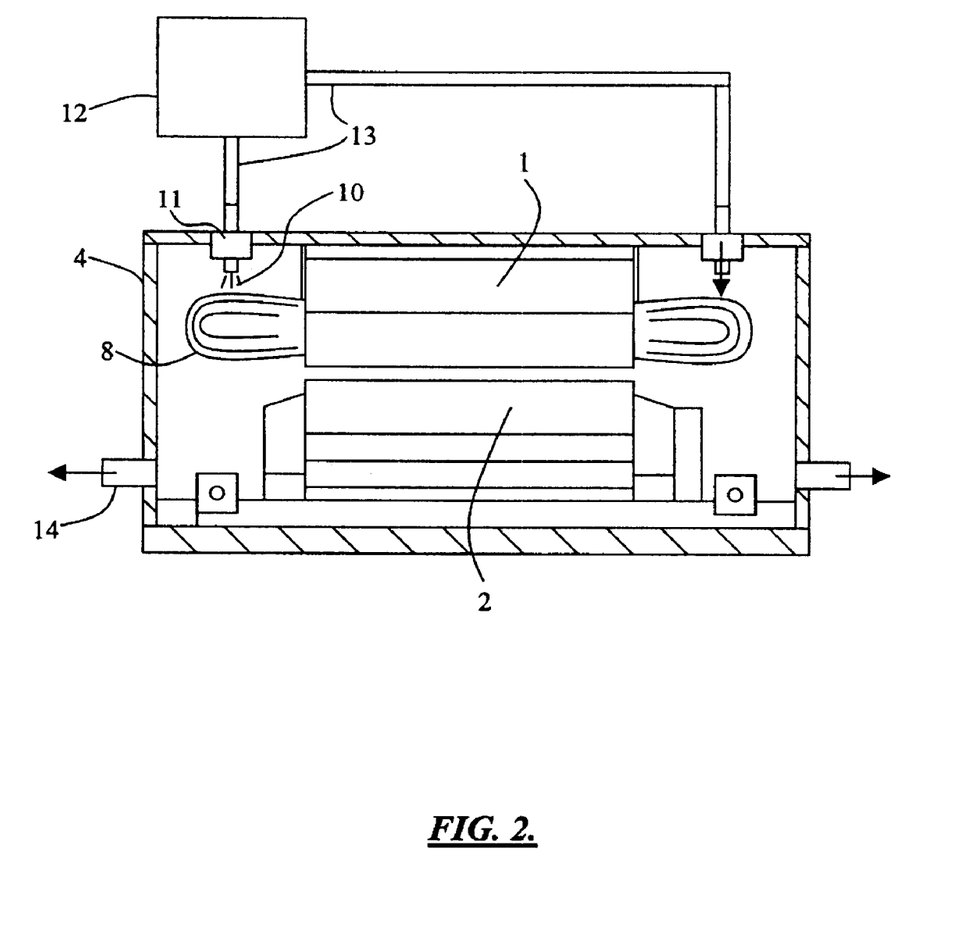
FIG. 2 schematically shows an electric motor in cross-sectional view comprising a jet impingement assembly.

Referring to FIG. 2, in one embodiment, the present invention involves a jet impingement assembly operable for bringing in fluid, which may be in the form of air or other fluid, from the outside of the motor housing 4, as opposed to conventional techniques in which fluid within the motor housing 4 is recirculated. The assembly comprises a jet 10, which is a forceful stream of fluid either gas or liquid, which is discharged from a narrow opening, nozzle, or inlet 11. The jet impingement system of the present invention operates by directing the forceful stream of fluid 10 so that it hits the hot surface of the end-windings 8, called the impingement surface. As the jet 10 flows over the impingement surface, the temperature controlled jet fluid 10 forces an accelerated convection heat transfer. Forced convection heat transfer is the flow of heat from the hot molecules on the surface of the end-windings 8, to the cold molecules of the flowing fluid 10. The faster the jet 10 moves, the greater the heat transfer. Increased dissipated heat transfer allows the electric motor to be operated at higher speeds than it could otherwise tolerate.

The layer where the cool fluid from the jet meets the hot fluid from the end-winding 8 impingement surface is called the boundary layer. At the jet impingement impact region, the boundary layer is very thin, and hence the heat from the end-winding is transferred very easily. Perfect heat transfer involves breaking the boundary layer completely. In the present invention, jet impingement reduces the boundary layer, making it very thin. When the jet impinges on the end-winding 8 surface, very thin hydrodynamic and thermal boundary layers form in the impingement region due to jet deceleration and increase in pressure. Consequently, extremely high heat transfer coefficients are obtained within a stagnation zone. Since the peak heat transfer only occurs within the stagnation zone, a single jet impingement provides an effective means where highly localized cooling is required, such as at the end-windings 8.

In the preferred embodiment, the jet impingement assembly comprises an inlet 11 attached to the motor housing 4, the inlet 11 operable for directing a cool stream of fluid to the interior of the motor housing 4 and the end-windings 8.

The inlet 11 is connected to an outside source of temperature controlled fluid. The jet impingement assembly includes a temperature controlling fluid generating device 12, such as a compressed air apparatus operable for storing temperature controlled fluid and producing pressure, which may act as the driving force for the temperature controlled fluid stream. The temperature controlled fluid is supplied from the generating device 12 to the end-winding 8 via the inlet 11. The fluid stream 10, or jet, may be of any pressure, temperature, diameter, or material that allows for the desired amount of cooling of the end-windings. The inlet 11 may include a nozzle, operable for directing the stream of fluid 10. The jet impingement device comprises a pathway 13 for the temperature controlled fluid from the temperature controlled fluid generating device to the inlet 11.

The jet impingement assembly of the current invention further includes an outlet 14, the outlet being operable for allowing fluid contained in the housing 4 to escape from the housing 4 to the outside atmosphere. The inlet 11 and outlet 14 of the present invention may be adjusted in size, number, and opened or closed based on the desired amount of cooling of the end-windings 8. A further advantage of the present invention is that, due to the jet impingement assembly, overall housing 4 temperatures may be reduced. The jet impingement assembly may also be controlled by a computer system, which is operable for setting jet temperature and pressure based on end-winding temperatures.

Figure 3:
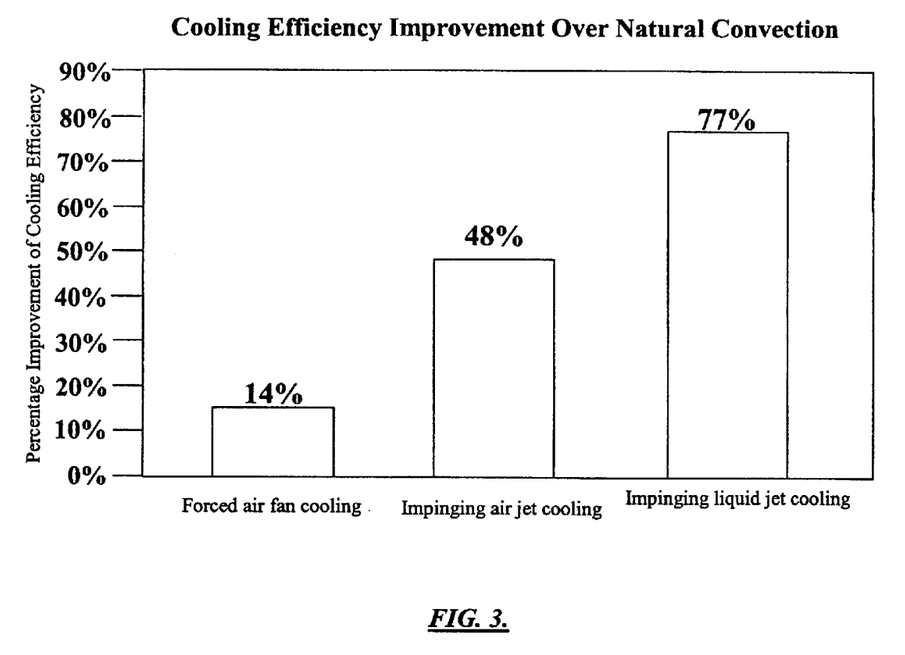
FIG. 3 is a bar graph illustrating the cooling efficiency improvements using jet impingement over natural convection.

A mathematical formula that represents the form of heat transfer of the present invention is Newton's Law of Cooling. As applied to the present invention, Newton's Law of Cooling states that the rate at which heat is transferred from the end-windings 8 to the temperature controlled fluid from the jet is related to a "proportionality constant often denoted as $h[W/m^2 \cdot °K]$ and called the heat transfer coefficient". Simulation studies were conducted regarding cooling methods. FIG. 3 illustrates jet impingement cooling efficiency performance over natural convection cooling. A grading of end-winding cooling efficiency was calculated for stagnant air, convection cooling using a fan, and jet impingement cooling. Stagnant cooling was the least efficient, removing only $10 \, W/m^2 \cdot °K$, convection cooling using a fan with air movement of 5–10 mph was better at $5–100 \, W/m^2 \cdot °K$, impingement air jet cooling was far better removing $300–500 \, W/m^2 \cdot °K$, depending upon speed, and impingement liquid jet cooling was the best, removing $1000–2000 \, W/m^2 \cdot °K$. As illustrated in FIG. 3, a simulation study was conducted which demonstrated that end-winding 8 temperature cooling efficiency was improved using jet impingement. Referring to FIG. 3, forced fluid fan cooling was 14% more efficient than natural convection cooling, impinging fluid jet cooling using air was 48% more efficient than natural convection cooling, and impinging liquid fluid jet cooling was 77% more efficient than natural convection cooling.

Figure 4:
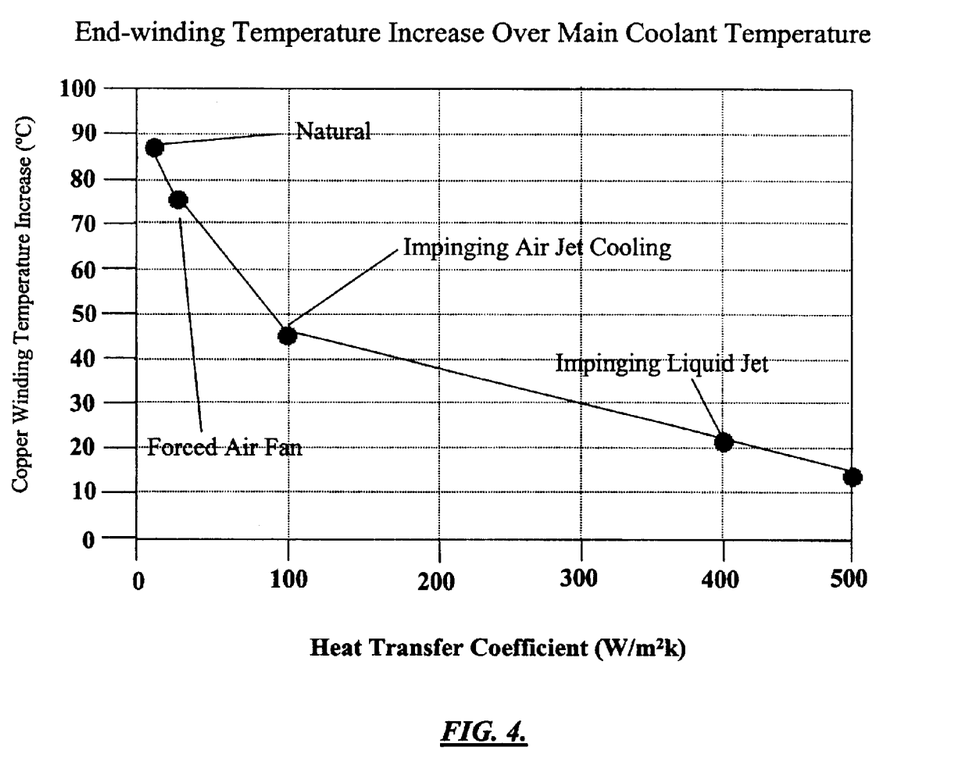
FIG. 4 is a plot illustrating end-winding temperature increase using different cooling methods.

Referring to FIG. 4, the end-winding temperature increase over the main coolant temperature is less for jet impingement cooling, both air and liquid, as it is for natural convection cooling and forced air fan cooling. The heat transfer coefficient of jet impingement is much greater than that of natural convection.

Figure 5:
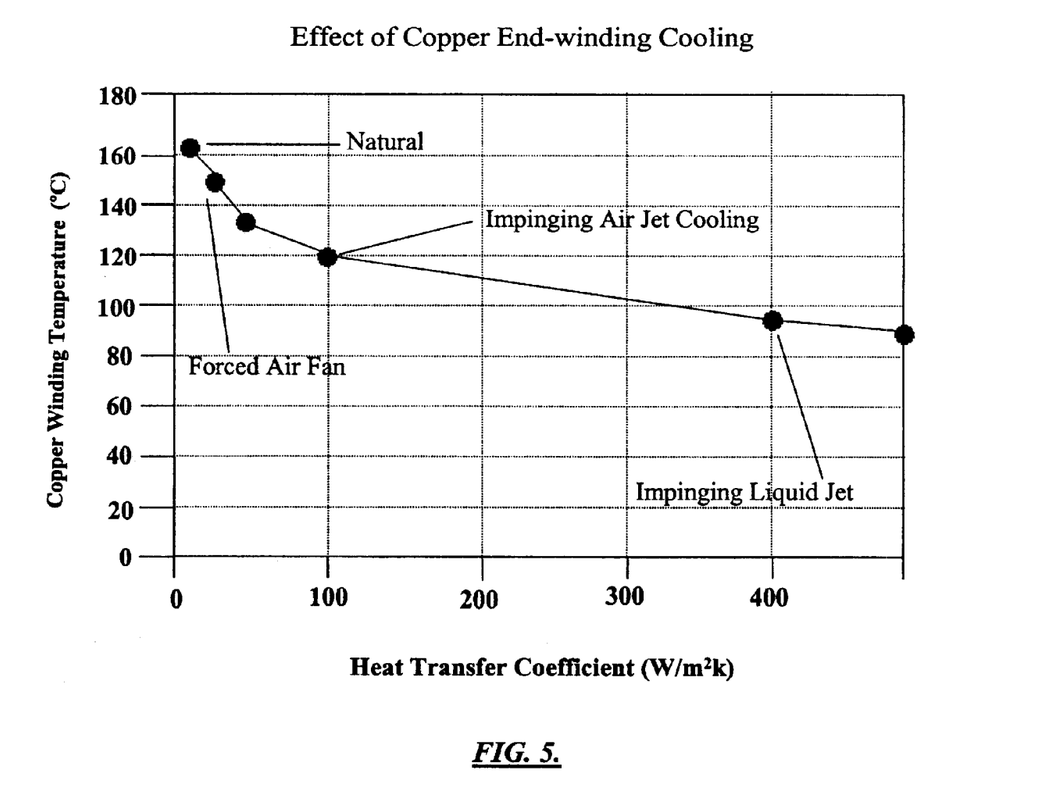
FIG. 5 is a plot illustrating the effect of winding temperature versus a heat transfer coefficient.

Referring to FIG. 5, the copper end-winding temperature decreases as jet impingement cooling is applied to the end-windings, again illustrating the ability of a jet impingement cooling assembly to remove large quantities of dissipated heat from the end-windings 8.

A temperature sensor may be located in the end-winding 8. As the temperature approaches an end limit, usually in the range of 150–185° C., preferably in the range of 150–180° C., current supplied to the motor is limited. Using the jet impingement assembly of the present invention, the temperature of the end-winding is lowered to around 150° C., or less, so that more current may be supplied to the motor. In general, other conditions remaining the same, the more current that is supplied to the motor, the more power the motor is able to generate, and the more torque the motor is able to generate. Current is directly proportional to torque. This is referred to as power density. The jet impingement cooling assembly of the present invention increases an electric motor's power density.

With natural convection cooling using stagnant air, as the air around the surface of the end-windings 8 approaches and equals the temperature of the end-windings 8 themselves, heat is no longer able to be transferred from the end-windings 8 to the surrounding air because the temperatures are equal. Heat will transfer through a path of minimum thermal resistance, hot to cold, and there is no benefit in traveling on a path to an equal temperature. For example, an experiment was conducted in which an end-winding limit temperature of 150° C. was selected, and, via an impinging air jet, a cool air stream of air having a temperature of about 72–75° C. was introduced. When the two air temperatures met at the boundary, the resulting air temperature in the housing was about 85° C., which is significantly less than the end-winding limit temperature of 150° C. The lower end-winding temperature resulted in a lower housing temperature and allowed for more current to be supplied to the motor.

The jet impingement assembly of the present invention results in lower temperatures of the end-windings of an electric motor, which results in increased motor reliability. As end-winding temperatures rise above a certain level, around 150–185° C., the performance and reliability of electric motors and generators become limited. Lower end-winding temperatures translate into higher motor performance, higher power density, and improved reliability of the motor. For a constant power rating, a motor with the cooling method of the present invention may be significantly smaller in size, lower in weight, and costs less than a motor with an electric motor with a traditional cooling method.

Since the field strength of a permanent magnet is inversely proportional to temperature, cooling the end-windings in effect allows the permanent magnet to operate at a high field strength and energy, which produces higher air gap flux and voltage in the stator. The reduction of heat radiating from the stator causes a reduction in the temperature of the end-windings, which lowers the resistance of the windings. This higher voltage and lower stator winding resistance reduces the current per kilowatt output or load. Since the efficiency and life of many power electronics is inversely proportional to current, the jet impingement cooling assembly and method will therefore increase the efficiency of the electric motor system as a whole, and increase the life efficiency of the magnets, stator windings, power electronics, and other components. Cooling the stator windings to a lower operating temperature improves the reliability and robustness of the electric motor system by increasing the operating margin of the system as a whole, and is particularly important at higher ambient temperatures.

The jet impingement cooling assembly of the present invention does not interfere with the primary function of the electric motor. The rotor, and all other components of the electric motor assembly, function as intended. The jet impingement assembly design does not block or prevent the cooling of the rotor.

Assemblies and methods for the cooling of electric motor end-windings utilizing jet impingement have been described herein. These, and other variations, which will be appreciated by those skilled in the art, are within the intended scope of this invention as claimed below. It is to be understood that the present invention may be embodied with various other changes, modifications and improvements, which may occur to those skilled in the art, without departing from the spirit and scope of the invention defined in the following claims.

What is claimed is:

1. An electric motor cooling assembly, comprising:
   a housing;
   a stator disposed within the housing, the stator operable for generating a magnetic field;
   a rotor disposed within the housing, the rotor operable for receiving the magnetic field and generating a torque;
   a winding operatively connected to the stator;
   an end-winding integrally formed with the winding;
   a jet impingement device operable for exposing the end-winding to a temperature controlled stream of fluid, the jet impingement device including a jet nozzle oriented to direct the temperature controlled stream onto an exterior surface of the end-winding.

2. The assembly of claim 1, wherein the jet impingement device comprises an inlet, the inlet operable for introducing and exposing the temperature controlled stream of fluid to the end-winding.

3. The assembly of claim 1, wherein the jet impingement device comprises an outlet, the outlet operable for removing fluid from the housing.

4. The assembly of claim 2, wherein the inlet comprises a nozzle, the nozzle operable for directing the temperature controlled stream of fluid to the end-winding.

5. The assembly of claim 1, wherein the temperature controlled stream of fluid comprises air.

6. The assembly of claim 1, wherein the jet impingement device comprises a temperature controlled fluid generating device.

7. The assembly of claim 1, wherein the jet impingement device comprises a pathway for the temperature controlled fluid from the temperature controlled fluid generating device to the inlet.

8. A method for transferring heat between a stream of fluid impinging a surface of an electric motor end-winding of an electric motor, comprising:
   controlling the temperature of a volume of fluid;
   establishing a stream of fluid from the volume of fluid to an inlet;
   delivering a jet stream of the temperature controlled fluid from the inlet to the end-winding such that heat is transferred between the surface of the end-winding and the jet stream of fluid impinging the surface of the end-winding; and
   removing fluid from the electric motor via an outlet.

9. The method of claim 8, wherein the temperature controlled fluid comprises air.

10. The method of claim 8, wherein the temperature controlled fluid is generated in a fluid generating device.

11. The method of claim 10, wherein the fluid generating device comprises a pathway for the temperature controlled fluid from the temperature controlled fluid generating device to the inlet.

12. An electric motor, comprising:
   a housing;
   a stator disposed within the housing, the stator operable for generating a magnetic field;

a rotor disposed within the housing, the rotor operable for receiving the magnetic field and generating a torque;

a winding operatively connected to the stator;

an end-winding comprising the ends of the stator winding, integrally formed with the stator winding;

a jet impingement device operable for exposing the end-winding to a temperature controlled jet stream of fluid.

13. The electric motor of claim 12, wherein the housing comprises an inlet, the inlet operable for introducing and exposing the temperature controlled fluid to the end-winding.

14. The electric motor of claim 12, wherein the housing comprises an outlet operable for removing fluid from the housing.

15. The electric motor of claim 13, wherein the inlet comprises a nozzle, the nozzle operable for directing the temperature controlled stream of fluid to the end-winding.

16. The electric motor of claim 12, wherein the temperature controlled stream of fluid comprises air.

17. The electric motor of claim 12, wherein the jet impingement device comprises a temperature controlled fluid generating device.

18. The electric motor of claim 12, wherein the jet impingement device comprises a pathway for the temperature controlled fluid from the temperature controlled fluid generating device to the inlet.

* * * * *

UNITED STATES PATENT AND TRADEMARK OFFICE
CERTIFICATE OF CORRECTION

PATENT NO. : 6,639,334 B2
DATED : October 28, 2003
INVENTOR(S) : Kanghua Chen et al.

It is certified that error appears in the above-identified patent and that said Letters Patent is hereby corrected as shown below:

<u>Title page,</u>
Item [75], Inventors, "Abul Masrur" should read as -- Md Abul Masrur --.

Signed and Sealed this

Twenty-fifth Day of January, 2005

JON W. DUDAS
*Director of the United States Patent and Trademark Office*